UNITED STATES PATENT OFFICE 2,417,059

PRODUCTION OF DICHLORODIFLUOROMETHANE

John D. Calfee, Manhasset, N. Y., and Lee B. Smith, Woodbridge, N. J., assignors to General Chemical Company, New York, N. Y., a corporation of New York No Drawing. Application March 19, 1946, Serial No. 655,596

4 Claims. (Cl. 260—653)

This invention relates chiefly to manufacture of dichlorodifluoromethane, $CCl_2F_2$, carbon tetrachloride, $CCl_4$, and other valuable products and by-products from chlorine and ethylidene fluoride, $CH_3CHF_2$, readily available raw materials.

Dichlorodifluoromethane is ordinarily made by a relatively cumbersome process involving the fluorination of carbon tetrachloride with hydrogen fluoride in the presence of antimony fluoride catalyst. Carbon tetrachloride is customarily produced by chlorinating carbon disulfide by a process which introduces the difficult problem of handling and recycling precipitated sulfur which in turn is utilized to make more carbon disulfide from a source of carbon such as charcoal or methane. Carbon tetrachloride thus obtained must be carefully purified to remove the last traces of sulfur.

The principal objects of this invention are provision of processes by which it is possible to prepare dichlorodifluoromethane and carbon tetrachloride and other fluorochloro and chloroproducts, by exhaustive chlorination and so-called chlorinolysis (disunion of carbon atoms by the action of chlorine) of ethylidene fluoride.

In accordance with the invention, it has been found that the foregoing objects may be accomplished by heating ethylidene fluoride at temperature not less than 550° C. and not more than 900° C. in the presence of certain suitable amounts of chlorine, and recovering the sought-for products from the resulting reaction mixture.

Particularly with respect to production of $CCl_2F_2$ and $CCl_4$, the reaction effected may be represented by the following equation:

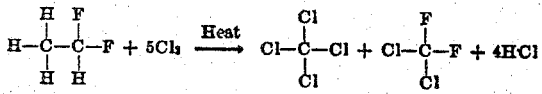

The process may be carried out in a tubular reactor of suitable length, equipped at one end with pipe connections facilitating introduction into the reactor of the desired proportions of raw materials, and at the outlet end with a gas offtake pipe for conducting the exit gas to the products recovery system. The reactor is provided with an external heating jacket together with means for maintaining controlled temperatures within the reactor. The reaction preferably should be carried out in the absence of catalysts such as active carbon and compounds of silicon. Hence, the reactor is preferably made of a neutral or non-catalytic material such as graphite.

The process is readily adaptable to a continuous operation in which the ethylidene fluoride and chlorine are continuously introduced into a reaction zone, subjected therein to the hereinafter described temperature conditions, and the resulting reacted mixture continuously discharged from the reaction zone.

Dichlorodifluoromethane is a preferred sought-for end product of the present process and accordingly the reaction is carried out in the presence of sufficient chlorine to obtain dichlorodifluoromethane, appreciable quantities of such product being obtainable when less than 5 molecular proportions of chlorine per mol of ethylidene fluoride are introduced into the reaction zone. While less than 5 molecular proportions of chlorine may be used, no particular advantage arises since conversion of ethylidene fluoride would be correspondingly reduced. To obtain acceptable yields of $CCl_2F_2$ and $CCl_4$, not less than 5 molecular proportions of chlorine should be charged into the reactor. An excess of chlorine is preferable, and it has been found that best results are secured when there is introduced into the reaction zone 5–6 molecular proportions of chlorine per mole of ethylidene fluoride.

We find that exhaustive chlorination and chlorinolysis of ethylidene fluoride may be effected by maintaining temperature in the reactor at not less than 550° C. and not more than 900° C. While chlorinolysis takes place at temperatures above 550° C., higher temperatures are desirable to substantially initiate and maintain chlorinolysis. Temperatures of not less than about 650° C. are preferred, and the preferred operating range is 650–800° C. Temperatures above about 900° C. serve no useful purpose and should be avoided to prevent unnecessary decomposition.

Assuming the presence in the reaction zone of sufficient chlorine to substitute for all of the hydrogen atoms of the ethylidene fluoride and to support chlorinolysis, exhaustive chlorination and chlorinolysis take place rapidly, and the gas stream may be passed thru the reactor at any suitable rate. Good conversion of ethylidene fluoride in the reactor is appreciably dependent upon space velocity per hour (volumes of reactant gas at room temperature per volume of reaction chamber per hour), the term "conversion" indicating the amount by weight of starting material which reacts during the course of the reaction. Space velocity per hour should be ordinarily not more than 5000—6000, and preferably in the range of 150 to 1000.

The exit gas of the reactor comprises principally $CCl_2F_2$ (B. P. minus 30° C.), $CCl_2F$ (B. P.

plus 23.8° C.), CCl₄ (B. P. 77° C.), CCl₃CF₂Cl (B. P. 92° C.), C₂Cl₄ (B. P. 122° C.), C₂Cl₆ (melts and sublimes at about 183° C.); and smaller amounts of other relatively high boiling materials such as C₂Cl₃HF₂ (B. P. about 72° C.); plus HCl and some HF and unreacted chlorine. Such a gas may be treated in any suitable way to recover the desired products. For example, the gas stream may be water-washed to remove most of the hydrochloric acid, washed with mild NaOH solution to remove chlorine and the last traces of HCl, and finally dried as by use of calcium chloride or silica gel. The exit of the drying step comprises principally CCl₂F₂, CCl₃F, CCl₄, and some CCl₃CF₂Cl and C₂Cl₄. If desired such gas stream may be cooled to say zero degrees C. to condense CCl₃F, CCl₄, CCl₃CF₂Cl and C₂Cl₄ and permit recovery of CF₂Cl₂ in the form of a gas. Thereafter, the liquid mixture of CCl₃F, CCl₄, CCl₃CF₂Cl and C₂Cl₄ may be distilled to separate and recover these materials individually. Most of the C₂Cl₆ as well as some of the other products boiling above room temperature collect in the bottom of the water scrubber as heavy oily layers. Such higher boiling reaction product collecting in the water and/or NaOH scrubbers may be recovered by suitable decantation and distillation operations. By-products such as HCl and chorline may be recovered in any suitable way.

Following is an example of practice of the invention: Ethylidene fluoride and chlorine in the molecular proportion of 1:5.5 respectively were mixed and passed at 150 S. V. H. through a neutral reactor (graphite tube) heated externally to maintain reaction temperature of about 700° C. The exit gases were washed with water to remove the halogen acids and with caustic soda solution to take out unreacted chlorine. The CCl₂F₂ in the product passed through the scrubbers and was condensed in a trap immersed in a dry ice acetone bath. In this operation, the higher boiling materials collected as heavy oily layers in the water and NaOH scrubbers and were drawn off to a storage vessel at regular intervals. These reaction products were separated into the several constituents by fractional distillation. From 100 molar parts of ethylidene fluoride, there were recovered 36 molar parts of CCl₂F₂, and 33 molar parts of CCl₄. Lesser quantities of CCl₃F, C₂Cl₄ and C₂Cl₆ were obtained. In all, about 85% of the carbon in the ethylidene fluoride entering the reactor was recovered as a valuable reaction product.

We claim:

1. The process which comprises heating ethylidene fluoride at temperature not less than 550° C. and not more than 900° C. in the presence of at least sufficient chlorine to form difluorodichloromethane.

2. The process which comprises heating ethylidene fluoride at temperature not less than 550° C. and not more than 900° C. in the presence of at least 5 molecular proportions of chlorine to thereby form difluorodichloromethane and carbon tetrachloride simultaneously.

3. The process which comprises heating ethylidene fluoride at temperature not less than 650° C. and not more than 800° C. in the presence of at least 5 molecular proportions of chlorine to thereby form difluorodichloromethane and carbon tetrachloride simultaneously.

4. The process which comprises heating ethylidene fluoride at temperature not less than 650° C. and not more than 800° C. in the presence of at least 5–6 molecular proportions of chlorine to thereby form difluorodichloromethane and carbon tetrachloride simultaneously, and recovering difluorodichloromethane and carbon tetrachloride from the resulting reaction mixture.

JOHN D. CALFEE.
LEE B. SMITH.